United States Patent
Wetzstein

(10) Patent No.: US 9,976,672 B2
(45) Date of Patent: May 22, 2018

(54) HANDLE LOCK FOR VALVE

(71) Applicant: Kurt George Wetzstein, Logan, IA (US)

(72) Inventor: Kurt George Wetzstein, Logan, IA (US)

( * ) Notice: Subject to any disclaimer, the term of this patent is extended or adjusted under 35 U.S.C. 154(b) by 0 days. days.

(21) Appl. No.: 14/845,591

(22) Filed: Sep. 4, 2015

(65) Prior Publication Data

US 2017/0067577 A1    Mar. 9, 2017

(51) Int. Cl.
*F16K 35/06* (2006.01)
*F16K 31/60* (2006.01)
*F16K 35/10* (2006.01)

(52) U.S. Cl.
CPC ............... *F16K 35/06* (2013.01); *F16K 31/60* (2013.01); *F16K 35/10* (2013.01); *Y10T 70/5628* (2015.04); *Y10T 70/5637* (2015.04); *Y10T 70/5774* (2015.04); *Y10T 70/5779* (2015.04); *Y10T 137/7069* (2015.04); *Y10T 137/7256* (2015.04)

(58) Field of Classification Search
CPC .......... F16K 35/00; F16K 35/06; F16K 35/10; Y10T 137/7069; Y10T 137/7256; Y10T 137/731; Y10T 137/7225; Y10T 137/5774; Y10T 137/5779; Y10T 137/5619; Y10T 137/5628; Y10T 137/5633; Y10T 137/5637; Y10T 70/5774; Y10T 70/5779; Y10T 70/5619; Y10T 70/5628; Y10T 70/5633; Y10T 70/5637

USPC ................. 251/90, 92, 93, 89; 137/383, 385
See application file for complete search history.

(56) References Cited

U.S. PATENT DOCUMENTS

| | | | | |
|---|---|---|---|---|
| 1,421,059 A | * | 6/1922 | Bashara | F16K 35/10 70/180 |
| 1,652,916 A | * | 12/1927 | Trottier | F16K 35/025 126/42 |
| 1,714,856 A | * | 5/1929 | Douglas | F16K 35/10 70/176 |
| 1,993,784 A | * | 3/1935 | Henderson | F16K 35/06 70/180 |
| 2,063,442 A | * | 12/1936 | Kriege | F16K 35/10 70/180 |
| 3,532,111 A | * | 10/1970 | Gaglio | F16K 35/10 137/385 |
| 3,960,168 A | * | 6/1976 | Plympton | F16K 35/10 137/385 |

(Continued)

*Primary Examiner* — Mary McManmon
*Assistant Examiner* — Hailey K Do
(74) *Attorney, Agent, or Firm* — Dunlap Bennett & Ludwig PLLC

(57) ABSTRACT

A valve lock is provided. The valve lock includes a lower lock bracket and an upper lock bracket. The lower lock bracket has a first flange plate having at least one lock hole formed therethrough. A lock plate extends from and is substantially perpendicular to the first flange plate. The lock plate is positioned to abut against a valve body when the valve lock is locked to a valve. The upper lock bracket includes a second flange plate having at least one lock hole aligned with the at least one lock hole of the first flange plate. A pair of upper lock tabs extends vertically from the second flange plate and forms a vertical channel. The vertical channel is sized to receive at least a portion of a valve handle within.

8 Claims, 3 Drawing Sheets

(56) References Cited

U.S. PATENT DOCUMENTS

| | | | | |
|---|---|---|---|---|
| 4,781,044 A * | 11/1988 | Ortega | F16K 35/10 |
| | | | 70/159 |
| 5,143,114 A * | 9/1992 | Daniels | F16K 35/06 |
| | | | 137/382 |
| 5,215,112 A * | 6/1993 | Davison | F16K 35/06 |
| | | | 137/385 |
| 5,238,141 A * | 8/1993 | Callegari | F17C 13/002 |
| | | | 137/382 |
| 5,353,833 A * | 10/1994 | Martinez | F16K 35/10 |
| | | | 137/385 |
| 5,806,555 A * | 9/1998 | Magno, Jr. | E05B 13/00 |
| | | | 137/385 |
| 6,152,161 A * | 11/2000 | Yokota | F16K 35/10 |
| | | | 137/38 |
| 6,786,230 B2 * | 9/2004 | Lacroix | F16K 35/10 |
| | | | 137/383 |
| 7,628,428 B2 * | 12/2009 | Rampton | F16L 58/02 |
| | | | 285/45 |
| 8,893,534 B1 * | 11/2014 | Niemi | E05B 67/383 |
| | | | 137/383 |
| 2010/0170580 A1 * | 7/2010 | Bott | F16L 35/00 |
| | | | 137/377 |
| 2014/0077490 A1 * | 3/2014 | Daniels | F16L 19/005 |
| | | | 285/80 |

\* cited by examiner

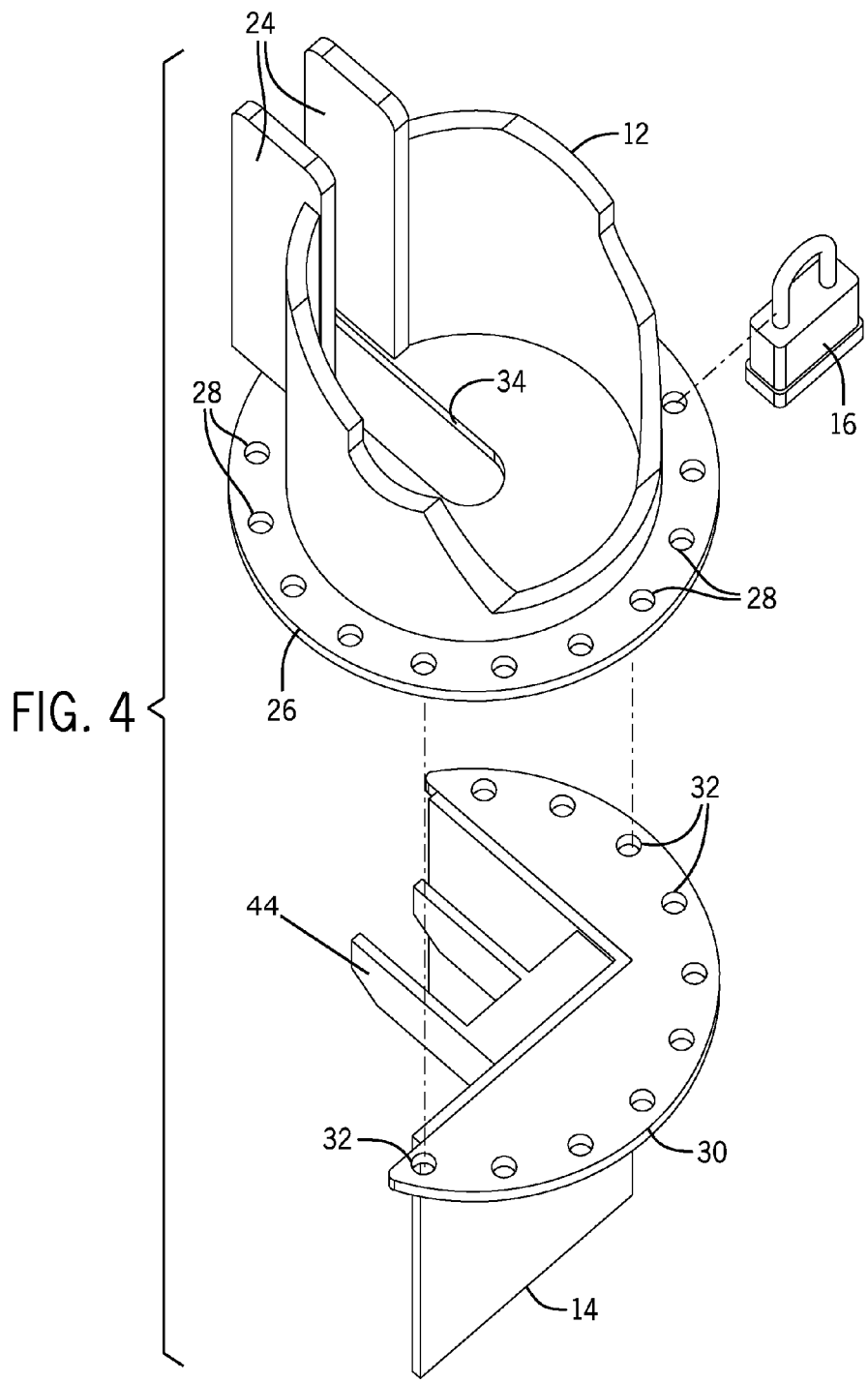

200~# HANDLE LOCK FOR VALVE

BACKGROUND OF THE INVENTION

The present invention relates to a valve lock and, more particularly, to a handle lock for a valve.

A gear actuated hand valve is typically used for industrial purposes. Currently, to lock gear actuated hand valves, a chain or cable is wrapped around the valve stem and handle. Using cables or chains secured with a padlock, the handle normally cannot be secured tightly enough to completely prevent movement of the handle. Therefore, a leak in the valve may be caused by accidently bumping the handle.

As can be seen, there is a need for a handle lock for a valve that prevents the handle from moving.

SUMMARY OF THE INVENTION

In one aspect of the present invention, a valve lock comprises: a lower lock bracket comprising a first flange plate comprising at least one lock hole and a lock plate extending from and substantially perpendicular to the first flange plate, wherein the lock plate is positioned to abut against a valve body; and an upper lock bracket comprising a second flange plate comprising at least one lock hole aligned with the at least one lock hole of the first flange plate, and a pair of upper lock tabs extending vertically from the second flange plate and forming a vertical channel, wherein the vertical channel is sized to receive at least a portion of a valve handle within.

In another aspect of the present invention, a method of locking a valve in a fixed position comprises: providing a lower lock bracket comprising a first flange plate comprising at least one lock hole, a pair of lower lock tabs forming a channel in between, and a lock plate extending from and substantially perpendicular to the first flange plate; placing a valve stem of a valve within the channel and the lock plate against a valve body of the valve; providing an upper lock bracket comprising a second flange plate comprising at least one lock hole, a horizontal slot formed from an edge of the second flange plate towards a center of the plate, and a pair of upper lock tabs extending vertically from the second flange plate and forming a vertical channel; placing the valve stem within the horizontal slot and at least a portion of a handle of the valve within the vertical channel; aligning the at least one lock hole of the lower lock bracket and the at least one lock hole of the upper lock bracket; and placing a shackle of a padlock within the aligned lock holes and locking the padlock.

These and other features, aspects and advantages of the present invention will become better understood with reference to the following drawings, description and claims.

BRIEF DESCRIPTION OF THE DRAWINGS

FIG. 4 is another exploded perspective view of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a lock device used on an industrial gear actuated hand valve. The present invention allows a gear actuated hand valve to be locked in the closed or open position with a padlock and without the use a chain or cable. The present invention firmly prevents movement of valve handles and does not require anything to be wrapped around piping.

Figure 1:
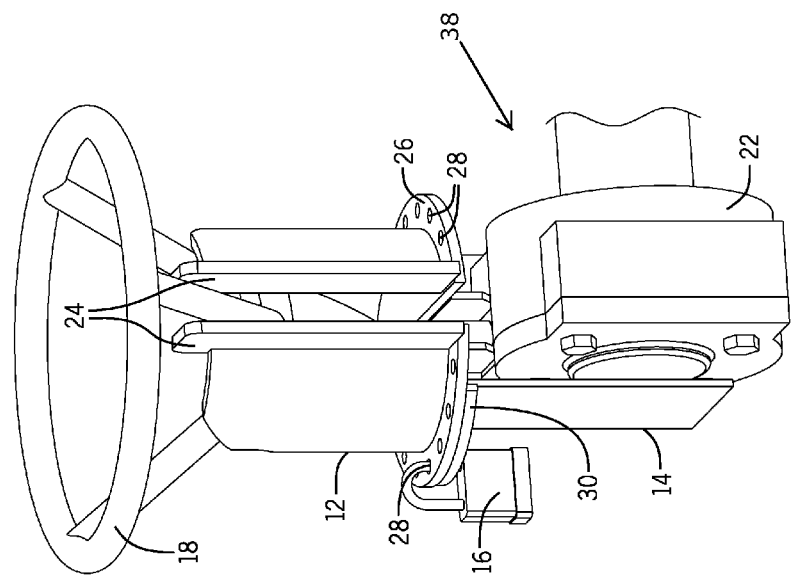
FIG. 1 is a perspective view of an embodiment of the present invention.
Figure 2:
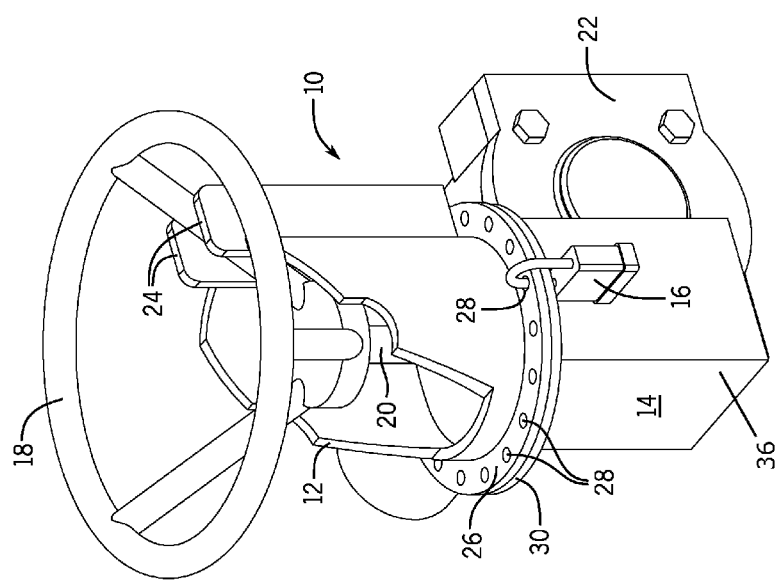
FIG. 2 is another perspective view of an embodiment of the present invention.
Figure 3:
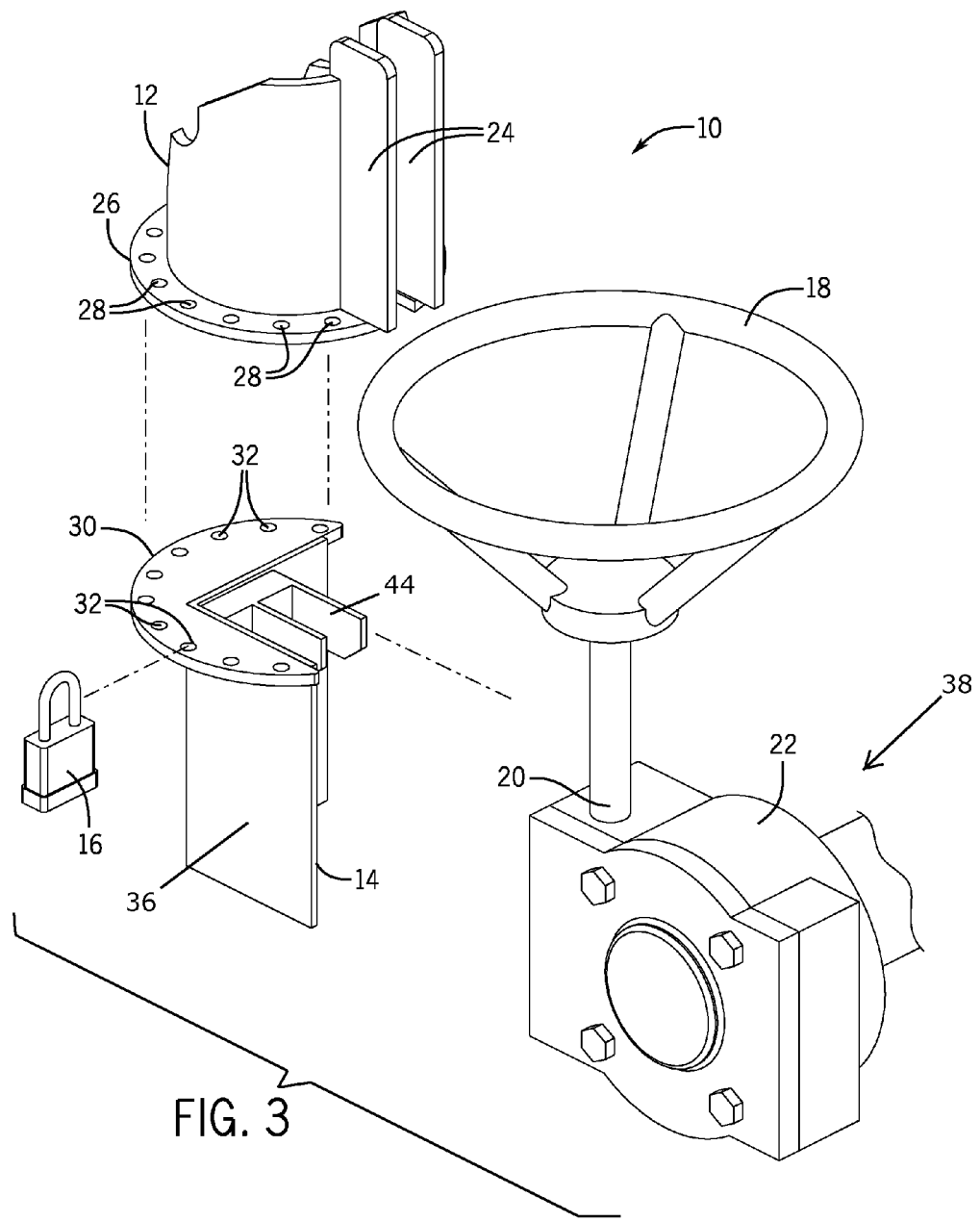
FIG. 3 is an exploded perspective view of an embodiment of the present invention.

Referring to FIGS. 1 through 4, the present invention includes a valve lock 10. The valve lock 10 includes a lower lock bracket 14 and an upper lock bracket 12. The lower lock bracket 14 has a first flange plate 30 having at least one lock hole 32 formed therethrough. A lock plate 36 extends from and is substantially perpendicular to the first flange plate 30. The lock plate 36 is positioned to abut against a valve body 22 when the valve lock 10 is locked to a valve 38. The upper lock bracket 12 includes a second flange plate 26 having at least one lock hole 28 aligned with the at least one lock hole 32 of the first flange plate 30. A pair of upper lock tabs 24 extends vertically from the second flange plate and forms a vertical channel. The vertical channel is sized to receive at least a portion of a valve handle 18 within.

In certain embodiments, the first flange plate 30 and the second flange plate 26 may have a circular shape. The lock holes 28, 32 of the first flange plate 30 and the second flange plate 26 may include a plurality of circumferentially disposed holes 28, 32 formed around the edge of the flange plates 26, 30. The flange plates 26, 30 may each include substantially planar inner surfaces that abut against one another in a locked position.

The upper lock bracket 12 may include a horizontal slot 34 formed through the second flange plate 26. The horizontal slot 34 may run from an edge of the second flange plate 26 towards a center of the second flange plate 26. The horizontal slot 34 is sized to receive a valve stem 20 within. The horizontal slot 34 meets with the vertical channel near the edge of the second flange plate 26.

In certain embodiments, the lower lock bracket 14 may further include a pair of lower lock tabs 44 extending from the lock plate 36 and forming a channel in between. The channel is sized to receive a valve stem 20 within. The lower lock bracket 14 may be retained about the valve 38 by the pair of lower lock tabs 44.

When using the present invention, the lower lock bracket 14 may be placed over a valve body 22 of a valve 38 such that the valve stem 20 is disposed in between the pair of lower lock tabs 44, and the locking plate 36 is pressed snuggly against the valve body 22 of the valve 38 The upper lock bracket 12 may be placed onto the valve handle 18 and valve stem 20 such that the valve stem 20 is disposed within the horizontal slot 34 and at least a portion of the valve handle 18 is disposed within the vertical channel. At least one lock hole 32 of the lower lock bracket 14 is aligned with at least one lock hole 28 of the upper lock bracket 26. A shackle of a padlock 16 may be placed within the aligned lock holes 28, 32 and the padlock 16 may be locked. Since at least a portion of the valve handle 18 is disposed within the vertical channel 24, and the lock plate 36 is abutting the valve body 22, the valve handle 18 is locked in a fixed position, unable to move unless the padlock 16 is removed.

The lower lock bracket 14 and the upper lock bracket 12 are separate pieces. Therefore, once the padlock 16 is removed, the valve handle 18 may be rotated with the lower lock bracket 14 and the upper lock brackets 12 still secured to the valve 28. The upper lock bracket 12 may rotate with the handle 18 such that the valve 38 is opened. Since each of the first flange plate 30 and the second flange plate 26 may include a plurality of lock holes 28, 32, different lock holes 28, 32 may align when the upper lock bracket 12 is rotated relative to the lower lock bracket 14. The padlock 16 may be inserted into the aligned lock holes 28, 32, thereby locking the valve 38 while the valve 38 is open. Therefore, the valve 38 may be opened and closed and locked in either position without removing the valve lock 10 of the present invention.

It should be understood, of course, that the foregoing relates to exemplary embodiments of the invention and that modifications may be made without departing from the spirit and scope of the invention as set forth in the following claims.

What is claimed is:

1. A valve lock comprising:
   a lower lock bracket comprising a first flange plate comprising at least one lock hole and a lock plate extending from and substantially perpendicular to the first flange plate, wherein the lock plate is positioned to abut against a valve body when the lower lock bracket is secured to a valve; and
   an upper lock bracket comprising a second flange plate comprising at least one lock hole aligned with the at least one lock hole of the first flange plate, a horizontal slot formed through the second flange plate starting from an outer edge of the second flange plate and extending towards a center of the second flange plate, and a pair of upper lock tabs extending vertically from the second flange plate and forming a vertical channel that intersects with the horizontal slot, wherein the vertical channel is sized to receive at least a portion of a valve handle within, wherein
   the at least one lock hole of at least one of the first flange plate and the second flange plate are a plurality of circumferentially disposed holes.

2. The valve lock of claim 1, wherein the lower lock bracket further comprises a pair of lower lock tabs extending from the lock plate and forming a channel in between sized to receive a valve stem within.

3. The valve lock of claim 1, further comprising a pad lock comprising a shackle, wherein the shackle is disposed within the aligned lock holes of the lower lock bracket and the upper lock bracket.

4. The valve lock of claim 1, wherein the lower lock bracket is separate from the upper lock bracket.

5. The valve lock of claim 1, wherein the first flange plate and the second flange plate are circular shaped.

6. The valve lock of claim 5, wherein the at least one lock hole of the first flange plate and the second flange plate are each a plurality of circumferentially disposed holes.

7. A method of locking a valve in a fixed position comprising:
   providing a lower lock bracket comprising a first flange plate comprising at least one lock hole, a pair of lower lock tabs forming a channel in between, and a lock plate extending from and substantially perpendicular to the first flange plate;
   placing a valve stem of a valve within the channel and the lock plate against a valve body of the valve;
   providing an upper lock bracket comprising a second flange plate comprising at least one lock hole, a horizontal slot formed from an edge of the second flange plate towards a center of the plate, and a pair of upper lock tabs extending vertically from the second flange plate and forming a vertical channel;
   placing the valve stem within the horizontal slot and at least a portion of a handle of the valve within the vertical channel;
   aligning the at least one lock hole of the lower lock bracket and the at least one lock hole of the upper lock bracket; and
   placing a shackle of a padlock within the aligned lock holes and locking the padlock.

8. The method of claim 7, wherein the at least on lock hole of the first flange plate and the second flange plate comprises a plurality of circumferentially disposed openings.

\* \* \* \* \*